United States Patent
Zhan et al.

(10) Patent No.: US 12,075,017 B2
(45) Date of Patent: Aug. 27, 2024

(54) METHOD FOR ACQUIRING COLOR DENSITY CHARACTERISTIC CURVE IN PRINTING

(71) Applicants: ZHEJIANG UNIVERSITY OF TECHNOLOGY, Zhejiang (CN); Zhejiang Puncher Digital Technology Co., Ltd, Zhejiang (CN)

(72) Inventors: Hongwu Zhan, Zhejiang (CN); Fang Xu, Zhejiang (CN); Zhiming Li, Zhejiang (CN); Libin Zhang, Zhejiang (CN)

(73) Assignees: ZHEJIANG UNIVERSITY OF TECHNOLOGY, Zhejiang (CN); Zhejiang Puncher Digital Technology Co., Ltd, Zhejiang (CN)

( * ) Notice: Subject to any disclaimer, the term of this patent is extended or adjusted under 35 U.S.C. 154(b) by 0 days.

(21) Appl. No.: 18/029,378

(22) PCT Filed: Jul. 26, 2022

(86) PCT No.: PCT/CN2022/107874
§ 371 (c)(1),
(2) Date: Mar. 30, 2023

(87) PCT Pub. No.: WO2024/011659
PCT Pub. Date: Jan. 18, 2024

(65) Prior Publication Data
US 2024/0022676 A1    Jan. 18, 2024

(30) Foreign Application Priority Data
Jul. 15, 2022 (CN) .......................... 202210829117.5

(51) Int. Cl.
*H04N 1/60* (2006.01)
*G06T 3/40* (2024.01)
(Continued)

(52) U.S. Cl.
CPC ............. *H04N 1/6027* (2013.01); *G06T 3/40* (2013.01); *G06T 7/11* (2017.01); *G06T 7/13* (2017.01); *G06T 2207/10024* (2013.01)

(58) Field of Classification Search
CPC .......... H04N 1/6027; G06T 3/40; G06T 7/11; G06T 7/13; G06T 2207/10024
See application file for complete search history.

(56) References Cited

U.S. PATENT DOCUMENTS

| | | | |
|---|---|---|---|
| 4,687,334 A | 8/1987 | Miyakawa | |
| 10,740,876 B1 * | 8/2020 | Lanman | ............... G02B 27/017 |

(Continued)

FOREIGN PATENT DOCUMENTS

| | | |
|---|---|---|
| CN | 104553302 | 4/2015 |
| CN | 107796773 | 3/2018 |

(Continued)

OTHER PUBLICATIONS

"International Search Report (Form PCT/ISA/210) of PCT/CN2022/107874," mailed on Jan. 18, 2023, pp. 1-5.

(Continued)

*Primary Examiner* — Mia M Thomas
(74) *Attorney, Agent, or Firm* — JCIPRNET (57) ABSTRACT

The present invention belongs to the field of printing, and specifically relates to a method for acquiring a color density characteristic curve in printing, including: designing a standard N-color level image of a single color channel; performing printout and scan correction on the standard N-color level image; performing edge finding operation on a corrected image; dividing the image into regions; and calculating a deviation. According to the method for acquiring a color density characteristic curve in printing by channels provided by the present invention, the color density characteristic curve of all the color channels may be obtained by (Continued)

sequentially using the method in the present invention on the color channels. The method in the present invention provides a basis for studying the performance of a printing system and further solving the problem of color density characteristic deviations at different positions.

16 Claims, 11 Drawing Sheets

(51) Int. Cl.
*G06T 7/11* (2017.01)
*G06T 7/13* (2017.01)

(56) References Cited

U.S. PATENT DOCUMENTS

| | | | | |
|---|---|---|---|---|
| 2004/0252317 | A1* | 12/2004 | Murakami | B41F 33/0045 358/1.9 |
| 2007/0036456 | A1* | 2/2007 | Hooper | G06T 5/20 382/274 |
| 2009/0290807 | A1* | 11/2009 | Marchesotti | H04N 21/84 382/261 |
| 2010/0123733 | A1* | 5/2010 | Zaharia | G06T 5/92 709/217 |
| 2017/0098310 | A1* | 4/2017 | Chefd'hotel | G06T 7/13 |
| 2018/0189935 | A1* | 7/2018 | McHugh | G06T 7/143 |
| 2019/0168514 | A1* | 6/2019 | Gazala | B41J 2/0451 |
| 2019/0311474 | A1* | 10/2019 | Angermann | G06V 10/776 |
| 2021/0287062 | A1* | 9/2021 | Encrenaz | G06K 15/1878 |
| 2022/0222791 | A1* | 7/2022 | Zhang | G06T 7/194 |

FOREIGN PATENT DOCUMENTS

| | | | |
|---|---|---|---|
| CN | 110949015 | 4/2020 | |
| CN | 111845092 | 10/2020 | |
| CN | 112040088 | 12/2020 | |
| CN | 114905851 | 8/2022 | |
| EP | 1486919 A2 * | 12/2004 | B41F 33/0045 |
| JP | 2004064305 | 2/2004 | |
| TW | 560173 | 11/2003 | |

OTHER PUBLICATIONS

"Written Opinion of the International Searching Authority (Form PCT/ISA/237) of PCT/ CN2022/107874," mailed on Jan. 18, 2023, pp. 1-3.

* cited by examiner

METHOD FOR ACQUIRING COLOR DENSITY CHARACTERISTIC CURVE IN PRINTING

CROSS-REFERENCE TO RELATED APPLICATION

This is a 371 application of the International PCT application serial no. PCT/CN2022/107874, filed on Jul. 26, 2022, which claims the priority benefits of China Application No. 202210829117.5, filed on Jul. 15, 2022. The entirety of each of the above-mentioned patent applications is hereby incorporated by reference herein and made a part of this specification.

BACKGROUND

Technical Field

The present invention belongs to the field of printing, and specifically relates to a method for acquiring a color density characteristic curve in printing.

Description of Related Art

The color density in printing is a measure of the reflection of specific color light by a print. After being extracted, a color density characteristic curve of a specific printing system may be used for pre-printing data processing of the printing system, so that the color density actually printed and output at any local part of a print plane by the printing system has an approximately same function relationship with the color level in printing, where the function is irrelevant to a measurement position on the print plane. In this way, when the same pure color is printed on the print plane, the color density actually obtained through printing can also be the same.

Due to the performance degradation of machine components, the characteristic change of paper, the difference in performance of ink consumables, etc. after long-term operation of a printer, the same printing color block will show different color densities at different positions on the print plane, and this deviation is in non-linear correlation with the color level value of the printing color block. A multi-pass scanout mode is used in small devices such as household and commercial printers, which may make up for this defect to a great extent, and a single-pass printing mode is mostly used in large digital printing devices, which becomes an important factor affecting the printing quality.

The color density characteristic curve is defined as a numerical relationship between the printing color densities and the printing color level values at different positions on a plurality of characteristic color levels in one printing system.

SUMMARY

To make up for the deficiencies in the prior art, the present invention provides a technical solution: a method for acquiring a color density characteristic curve in printing.

A method for acquiring a color density characteristic curve in printing includes:
  S1: designing a standard N-color level image of a single color channel;
  S2: performing printout and scan correction on the standard N-color level image;
  S3: performing edge finding operation on a corrected image;
  S4: dividing the image into regions; and
  S5: calculating a deviation.

Further, in S1, a value of N is specified as follows:
  for a single-channel color level image with an 8-bit depth, N is not less than 5; and
  for a single-channel color scale image with a 16-bit depth, N is not less than 10.

Further, in S1, a height of each color level is greater than ½ of a printing resolution in a height direction.

Further, in S1, 70% of color levels are distributed in a range of high ½ color level values; and a color level 0 is 10% lower than a full color level value.

Further, S2 includes:
  S201: adding a positioning mark pattern at midpoints of white spaces of an upper edge and a lower edge of the standard N-color level image, respectively;
  S202: printing the standard N-color level image containing the positioning mark patterns on paper by using a printer;
  S203: scanning printed paper in S202 by using a scanner, to obtain a single-channel image file; and
  S204: correcting a rotation deviation of a single-channel image generated during printing and scanning.

Further, S204 includes:
  S2041: searching for the upper and lower positioning mark patterns on the obtained single-channel image by using an image recognition module, and calculating center pixel coordinates of the two positioning mark patterns, to obtain an abscissa deviation $\Delta x$ and an ordinate deviation $\Delta y$ of the center pixel coordinates of the two positioning mark patterns;
  S2042: calculating a deflection angle $\theta$ according to a formula $$\theta = \frac{\Delta x}{\Delta y \times \pi} \times 180°;$$

and
  S2043: correcting the color level image with image rotation in an image processing technology according to the deflection angle $\theta$.

Further, S3 includes:
  S301: repositioning a top midpoint of the standard N-color level image by using an image recognition module according to the corrected image;
  S302: calculating a top center; and
  S303: setting a sampling step length, testing average color density values of sampling regions on left and right sides by using a loop algorithm, and when it is showed that the average color density values of the sampling regions are greater than a set value, indicating that a boundary has been reached, stopping loop, and retracting one sampling step length.

Further, S4 includes:
  S401: calculating the total number of effective regions, that is, calculating the total number of left and right sampling regions; and
  S402: drawing a rectangular sampling region on the color image with the 8-bit or 16-bit depth according to a width of the sampling regions and a width of the color levels.

Further, S5 includes:

S501: defining a color density value with a length of N, and storing expected color density values of N color levels on the standard N-color level image that are printed on paper;

S502: defining an array with the number of rows being N and the number of columns being equal to the total number of effective regions for storing difference values between average color density values of the color levels and the regions and the expected color density values in S501; and S503: drawing a schematic deviation diagram in a corresponding rectangular sampling region.

According to the method for acquiring a color density characteristic curve in printing by channels provided by the present invention, the color density characteristic curve of all the color channels may be obtained by sequentially using the method in the present invention on the color channels. The method in the present invention provides a basis for studying the performance of a printing system and further solving the problem of color density characteristic deviations at different positions.

DESCRIPTION OF THE EMBODIMENTS

In the description of the present invention, it should be understood that the orientational or positional relationships indicated by the terms "one end", "the other end", "outer side", "upper", "inner side", "horizontal", "coaxial", "center", "end part", "length", "outer end", etc. are based on the orientational or positional relationships shown in the accompanying drawings, merely for the convenience of describing the present invention and simplifying the description, rather than indicating or implying that the device or element referred to must have a particular orientation or be constructed and operated in a particular orientation, and therefore cannot be understood as limiting the present invention.

The present invention is further described below in combination with the accompanying drawings.

Figure 1:
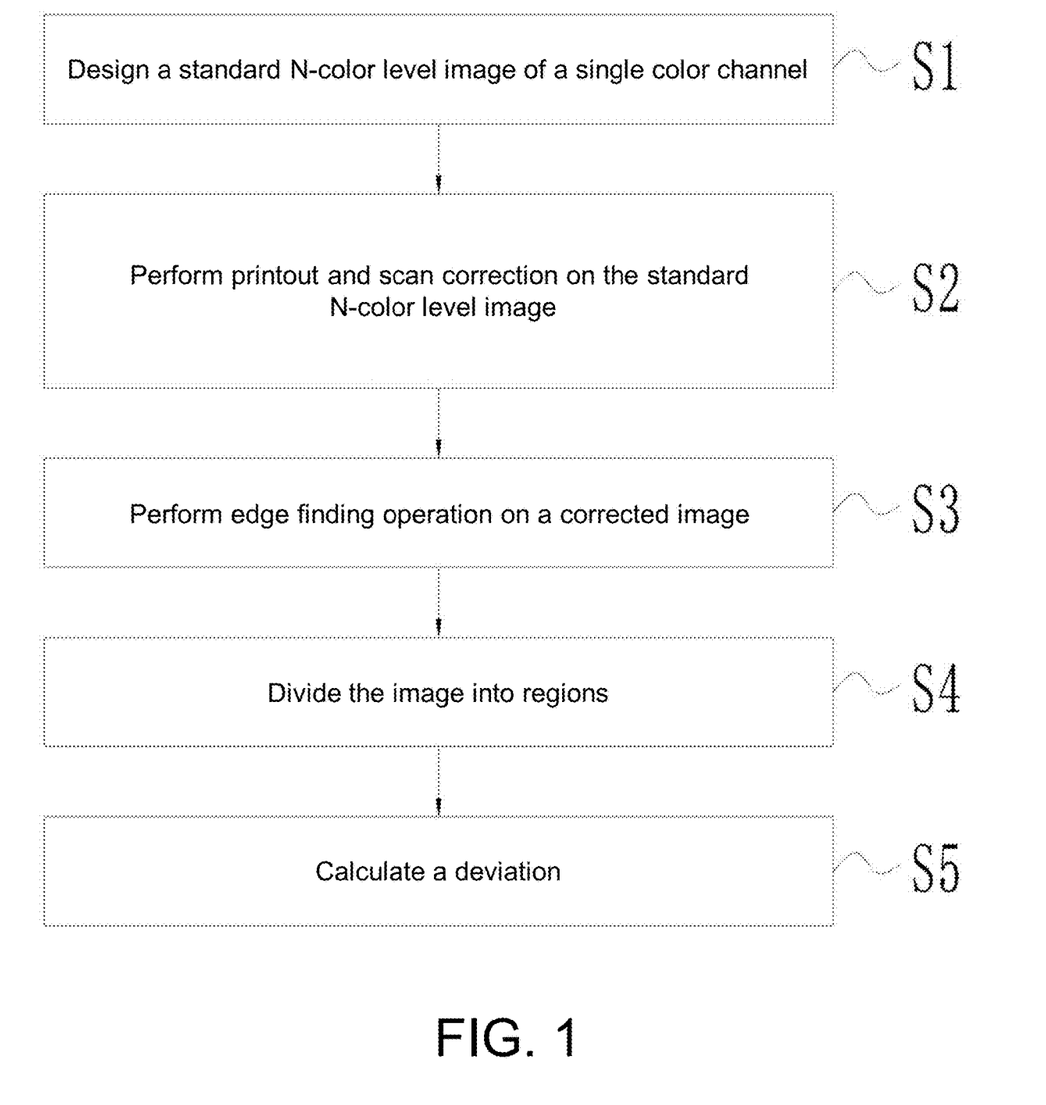
FIG. 1 is a flow chart of the present invention.

As shown in FIG. 1, a method for acquiring a color density characteristic curve in printing includes the following steps:

S1: designing a standard N-color level image of a single color channel.

Figure 2:
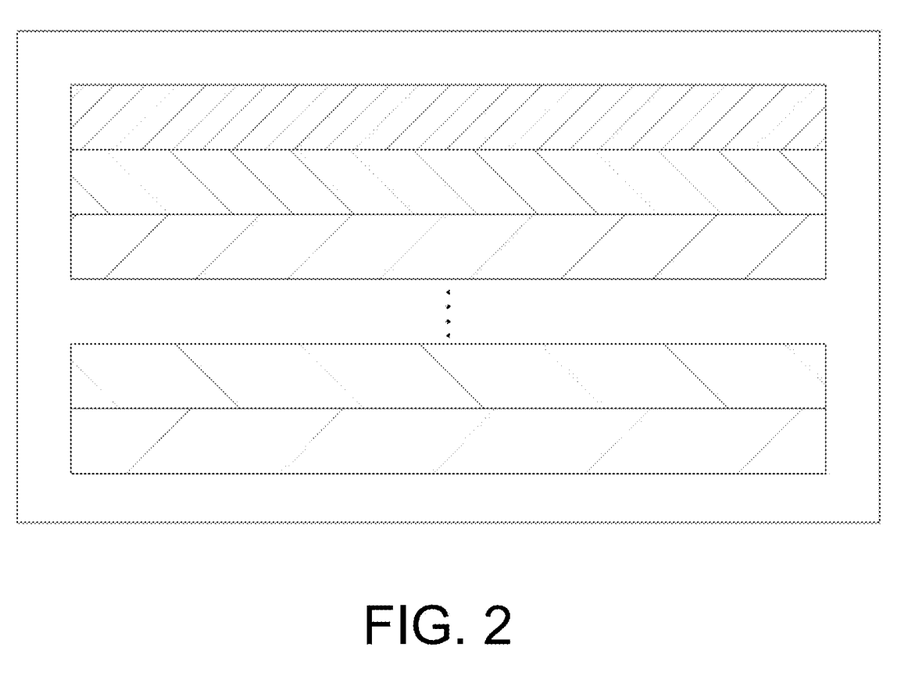
FIG. 2 is a schematic diagram of a standard N-color level image in the present invention.

The standard N-color level image as shown in FIG. 2, preferably a pure color level image is designed. For the convenience of illustration, a color level value is represented by a diagonal density in FIG. 2. The higher the density is, the greater the color level value is. A width of the color level image is determined according to a maximum output width of a printer, and a resolution of the color level image is determined according to a maximum output resolution of the printer.

In general, a height of each color level should be greater than ½ of a printing resolution in a height direction. A greater color level height is beneficial to the accuracy of a color density characteristic curve.

A value of N: in general, it should not be less than 5 for a single-channel color level image with an 8-bit depth and should not be less than 10 for a single-channel color level image with an 16-bit depth.

Distribution of N color levels: 70% of color levels should be distributed in a range of high ½ color level values. A color level 0 should be about 10% lower than a full color level value (a full color level value of an 8-bit depth channel is 255, and a full color level value of an 16-bit depth single channel is 65,535).

Figure 3:
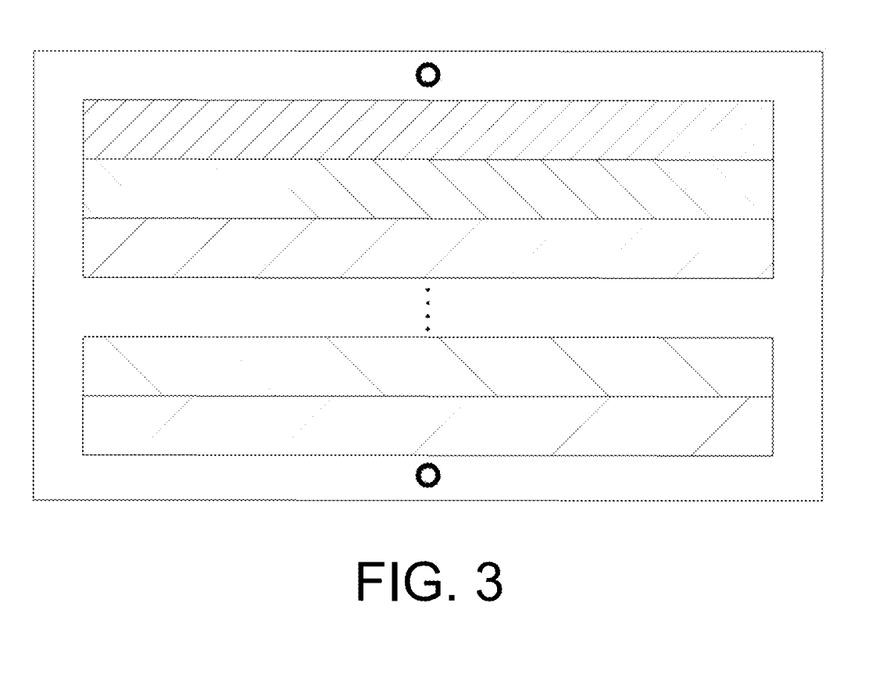
FIG. 3 is a schematic diagram of positioning mark patterns in the present invention.

S2: performing printout and scan correction on the standard N-color level image, which specifically includes:

S201: as shown in FIG. 3, adding a positioning mark pattern at midpoints of white spaces of an upper edge and a lower edge of the designed standard N-color level image, respectively, where the positioning mark pattern should have shape characteristics obviously distinguished from those of the color level image.

The better positioning mark pattern should have the following characteristics: after planar rotational motion, it may be coincident with an original image only through planar translational motion, and typically, it is a circle or ring pattern.

S202: printing the standard N-color level image containing the positioning mark patterns on specific paper by using a printer.

S203: scanning the printed paper by using a scanner, to obtain a single-channel image file.

Figure 4:
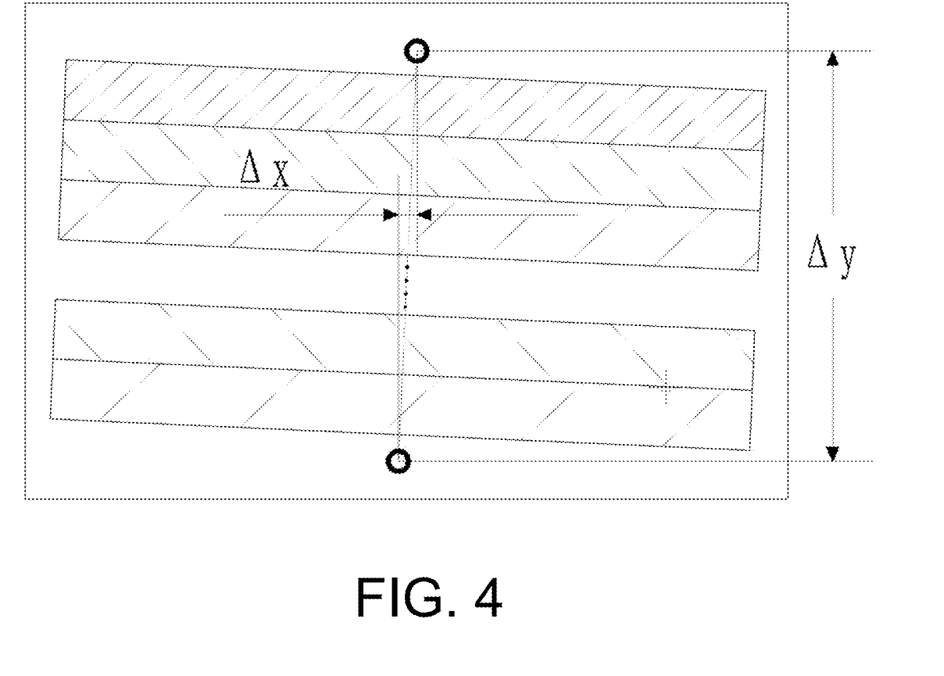
FIG. 4 is a schematic diagram of a correction principle in the present invention.

S204: correcting a rotation deviation of a single-channel image generated during printing and scanning, which specifically includes:

S2041: as shown in FIG. 4, searching for the upper and lower positioning mark patterns on the obtained single-channel image by using an image recognition module, and calculating center pixel coordinates of the positioning mark patterns, to obtain an abscissa deviation Δx and an ordinate deviation Δy of the center pixel coordinates of the two positioning mark patterns.

The image recognition module is a basic pattern recognition method. A template is a known small image, and template matching is to search for a target in a large image and determine its coordinate position. Common image recognition modules include a correlation method, an error method, a secondary matching error algorithm, etc. Specifically, the correlation method is used in the present invention. In an example, the positioning mark pattern is the template used by the algorithm. The pattern is used for search in the large color level image.

In the correlation method, the template T(m,n) is stacked on the searched large image S(W,H) and horizontally moved, and a region of the searched image that is covered by the template is called a sub-image $S_{ij}$, where i and j are coordinates of a lower left corner of the sub-image on the searched large image S, and a search range is as follows: 1≤i≤W−n and 1≤j≤H−m. The similarity between T and $S_{ij}$ may be measured by the following formula:

$$D(i, j) = \sum_{m=1}^{M} \sum_{n=1}^{N} [S_{ij}(m, n) - T(m, n)]^2$$

it is normalized, to obtain a correlation coefficient of template matching:

$$R(i, j) = \frac{\sum_{m=1}^{M} \sum_{n=1}^{N} S_{ij}(m, n) \times T(m, n)}{\sqrt{\sum_{m=1}^{M} \sum_{n=1}^{N} [S_{ij}(m, n)]^2} \sqrt{\sum_{m=1}^{M} \sum_{n=1}^{N} [T(m, n)]^2}}$$

when the template is the same as the sub-image, the correlation coefficient R(i,j)=1; and after all searches are completed in the searched image S, a maximum $R_{max}$ ($i_m$, $j_m$) of R is found, so that the corresponding sub-image $S_{i_m j_m}$ is a matching target, and ($i_m$, $j_m$) is a matching coordinate position.

S2042: calculating the rotation deviation of the image by the following method: because a value of Δx is far less than Δy, it may be likened to a sector, where an arc length is the abscissa deviation, and a radius is the ordinate deviation; and then a deflection angle $$\theta = \frac{\Delta x}{\Delta y \times \pi} \times 180°$$

is calculated by using a formula $$\Delta x = \Delta y \times \frac{\theta}{180°} \times \pi$$

of the arc length equal to the angle multiplied by the radius, to obtain the deflection angle θ.

S2043: correcting the color level image with image rotation in an image processing technology according to the deflection angle θ.

Figure 5:
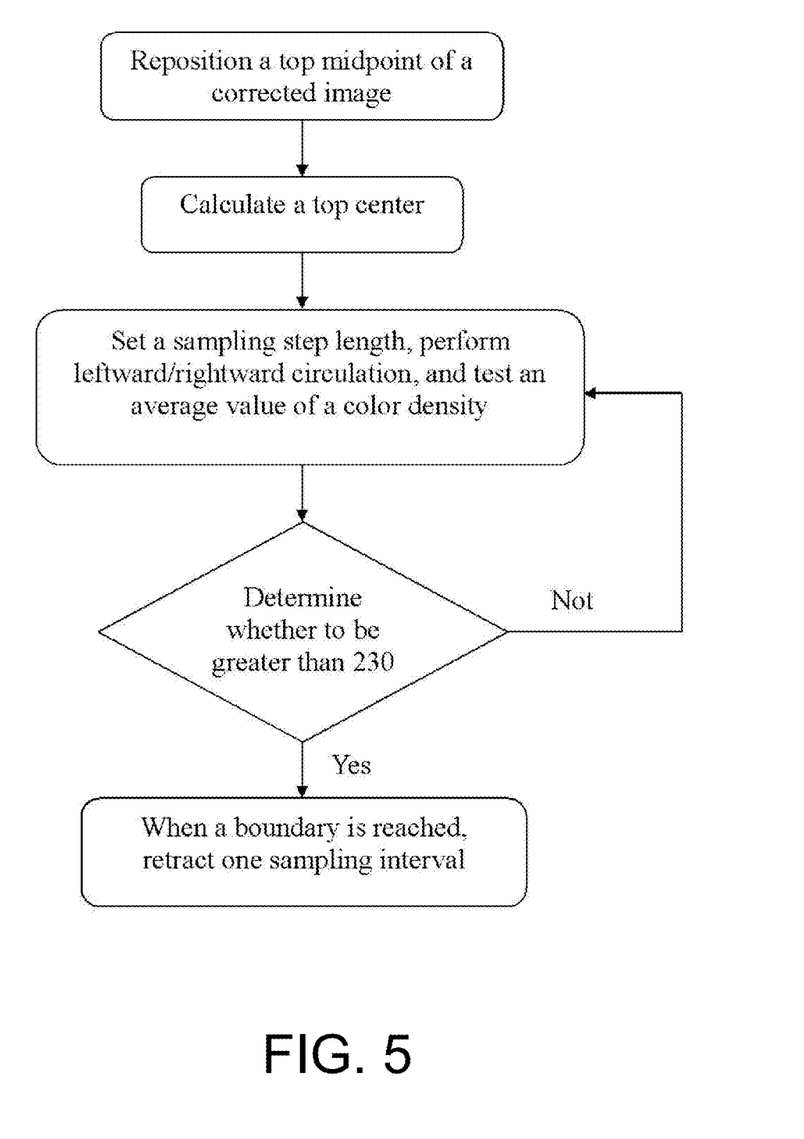
FIG. 5 is a flow chart of edge finding operation in the present invention.

S3: as shown in FIG. 5, performing edge finding operation on a corrected image, which specifically includes:

S301: repositioning a top midpoint of the color level image by using an image recognition module according to the corrected image.

S302: calculating a top center.

Figure 6:
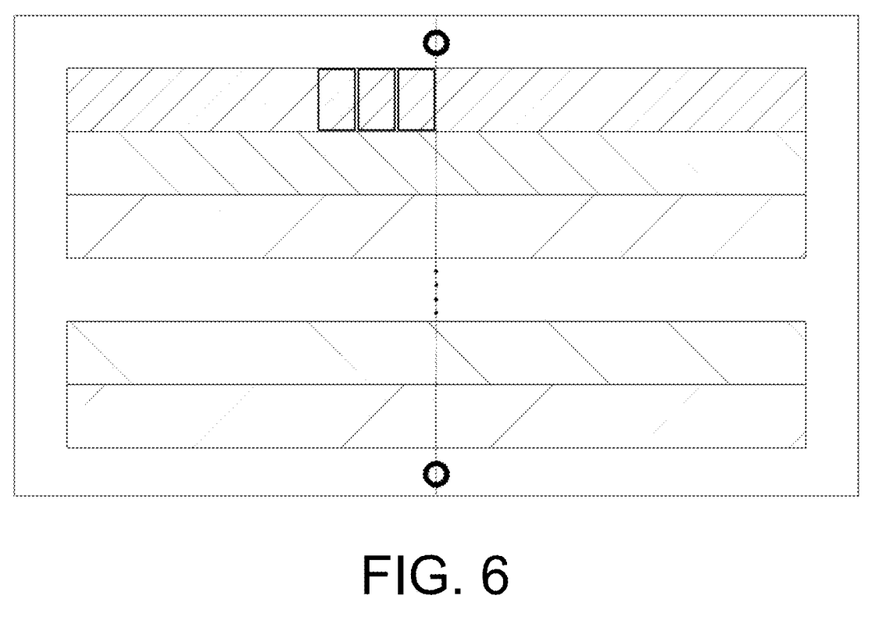
FIG. 6 is a schematic diagram of edge finding operation in the present invention.
Figure 7:
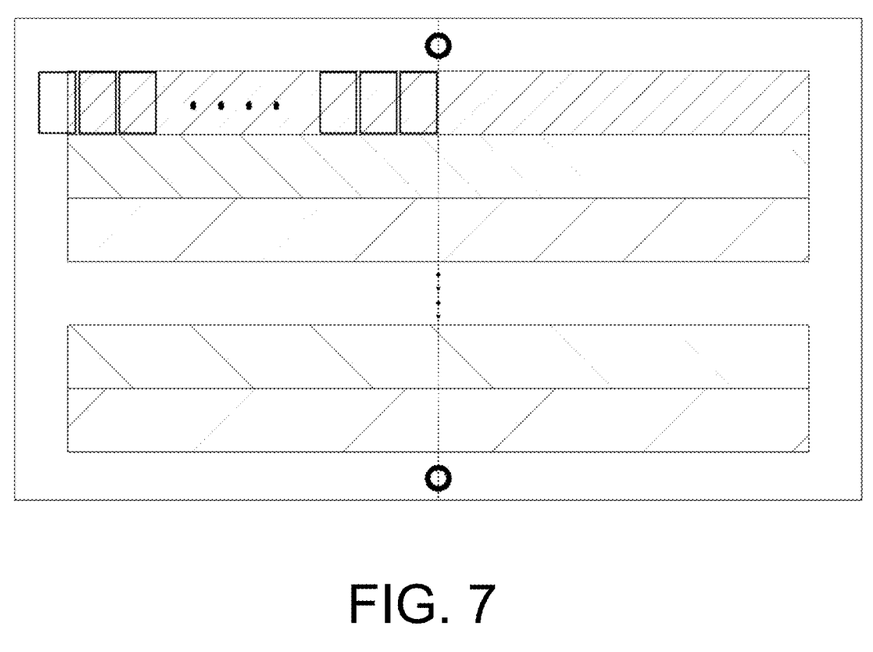
FIG. 7 is a principle diagram of boundary determination during edge finding in the present invention.

S303: as shown in FIGS. 6 and 7, setting a sampling step length, testing an average color density value of a sampling region on a left side by using a loop algorithm, and when it is showed that the average color density value of the sampling region is greater than a set value, indicating that a boundary has been reached, stopping loop, and retracting one sampling step length; and continuing to perform same sampling on a right side, and determining loop stop.

S4: dividing the image into regions, which includes:

S401: calculating the total number of effective regions, that is, calculating the total number of left and right sampling regions.

Figure 8:
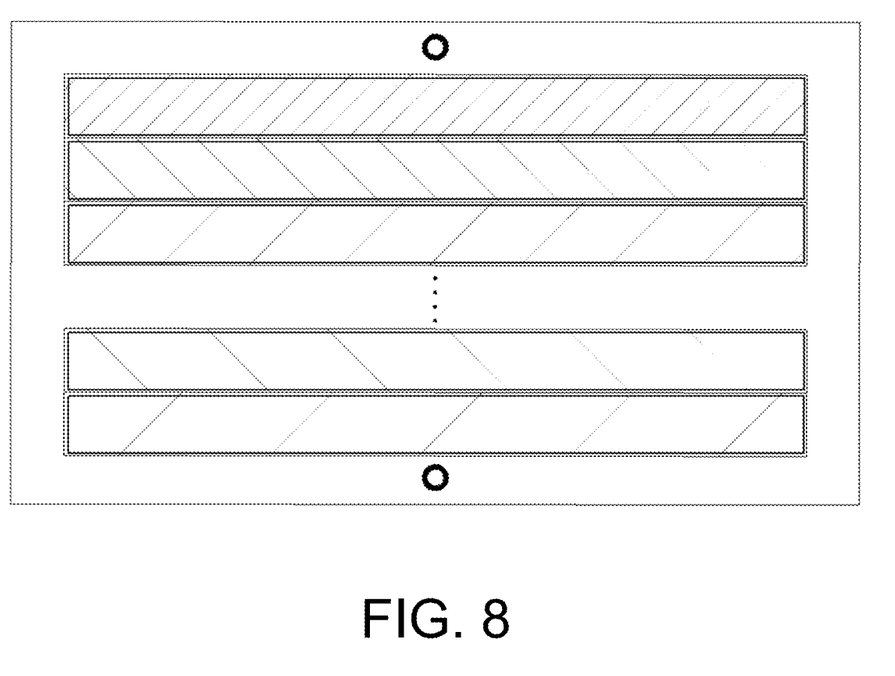
FIG. 8 is a schematic diagram of drawing a rectangular sampling region in the present invention.

S402: as shown in FIG. 8, drawing a rectangular sampling region on the color image with the 8-bit or 16-bit depth according to a width of the sampling regions and a width of the color levels.

S5: calculating a deviation, which includes:

S501: defining a color density value with a length of N, and storing expected color density values of N color levels on the standard N-color level image that are printed on paper.

S502: defining an array with the number of rows being N and the number of columns being equal to the total number of effective regions for storing difference values between average color density values of the color levels and the regions and the expected color density values in S501.

S503: visualizing color density data, and drawing a schematic deviation diagram, preferably a deviation broken-line graph in a corresponding rectangular sampling region.

Embodiment 1

Figure 9:
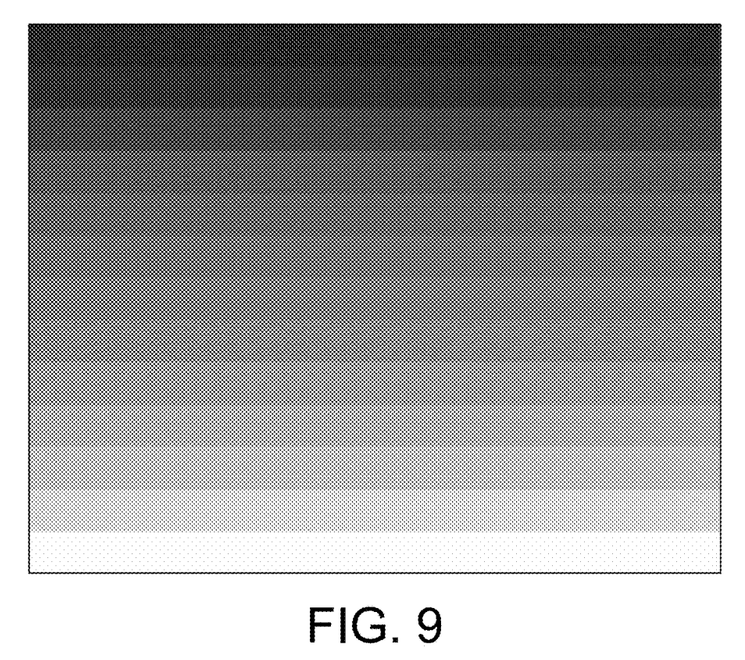
FIG. 9 is a schematic diagram of a standard 13-color level image in Embodiment 1.

This embodiment is the specific embodiment of the above method for acquiring a color density characteristic curve in printing, which includes the following steps:

S1: designing a black standard 13-color level image of a single color channel.

The black standard 13-color level image as shown in FIG. 9 is designed, and 13 color level values of the black standard 13-color level image are as shown in Table 1.

TABLE 1

13 color level values of a black standard 13-color level image

| | | | | | | | | | | | | |
|---|---|---|---|---|---|---|---|---|---|---|---|---|
| 61679 | 59109 | 55255 | 51399 | 48829 | 44975 | 41119 | 37265 | 30840 | 24416 | 17990 | 10280 | 0 |

The standard 13-color level image has a resolution of 1,200 dpi, a width of 13,000 pixels, and a length of 16,318 pixels, and a width of each color level is 1,000 pixels.

Figure 10:
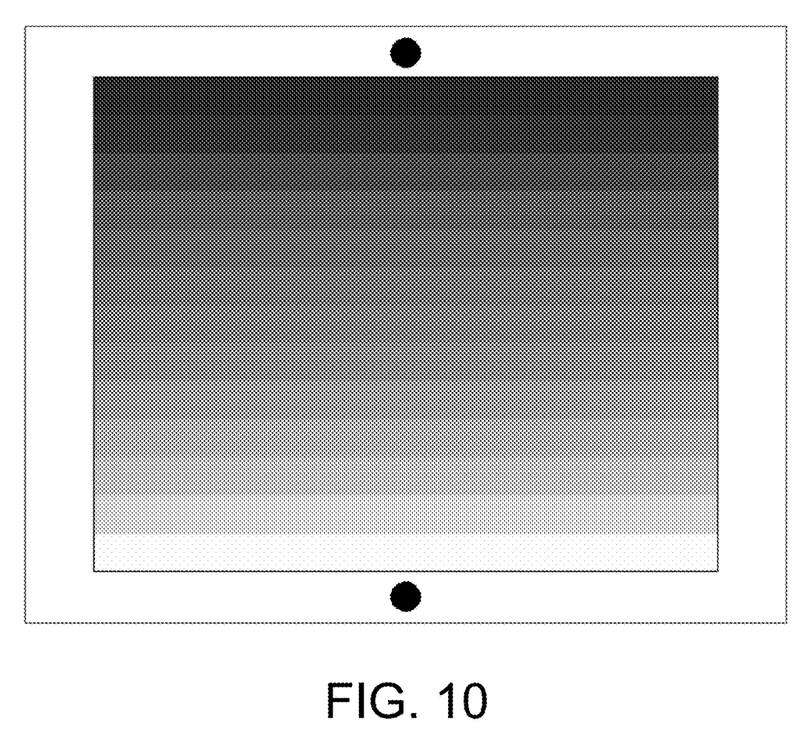
FIG. 10 is a schematic diagram of positioning mark patterns in Embodiment 1.

S2: performing printout and scan correction on the black standard 13-color level image, which specifically includes:

S201: as shown in FIG. 10, adding a positioning mark pattern at midpoints of white spaces of an upper edge and a lower edge of the black standard 13-color level image, respectively, where the positioning mark pattern is specifically a black circle.

Figure 11:
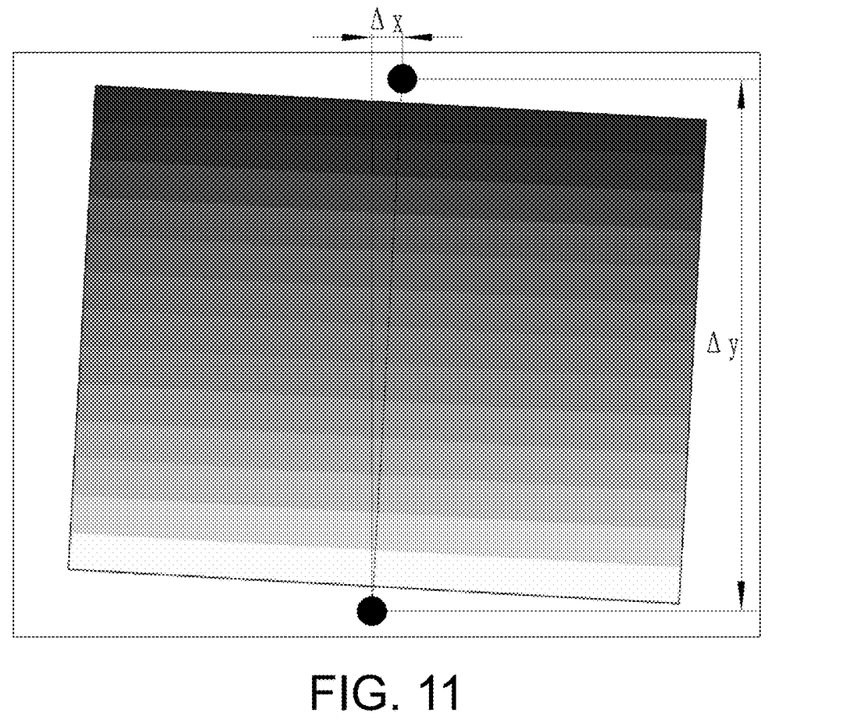
FIG. 11 is a schematic diagram of a correction principle in Embodiment 1.

S202: printing the black standard 13-color level image containing the positioning mark patterns on specific paper by using a printer, where an effect is as shown in FIG. 11.

S203: scanning the printed paper by using a scanner, to obtain a single-channel image file.

S204: correcting a rotation deviation of a single-channel image generated during printing and scanning, which specifically includes:

S2041: searching for the upper and lower positioning mark patterns on the above single-channel image by using a conventional image template matching algorithm, and calculating center pixel coordinates of the positioning mark patterns, to obtain an abscissa deviation $\Delta x$ and an ordinate deviation $\Delta y$ of the center pixel coordinates of the two positioning mark patterns.

S2042: calculating the rotation deviation of the image by the following method: because a value of $\Delta x$ is far less than $\Delta y$, it may be likened to a sector, where an arc length is the abscissa deviation, and a radius is the ordinate deviation; and then a deflection angle $$\theta = \frac{\Delta x}{\Delta y \times \pi} \times 180°$$

is calculated by using a formula $$\Delta x = \Delta y \times \frac{\theta}{180°} \times \pi$$

of the arc length equal to the angle multiplied by the radius, to obtain the deflection angle $\theta$.

S2043: correcting the color level image with image rotation in an image processing technology according to the deflection angle $\theta$.

Figure 13:
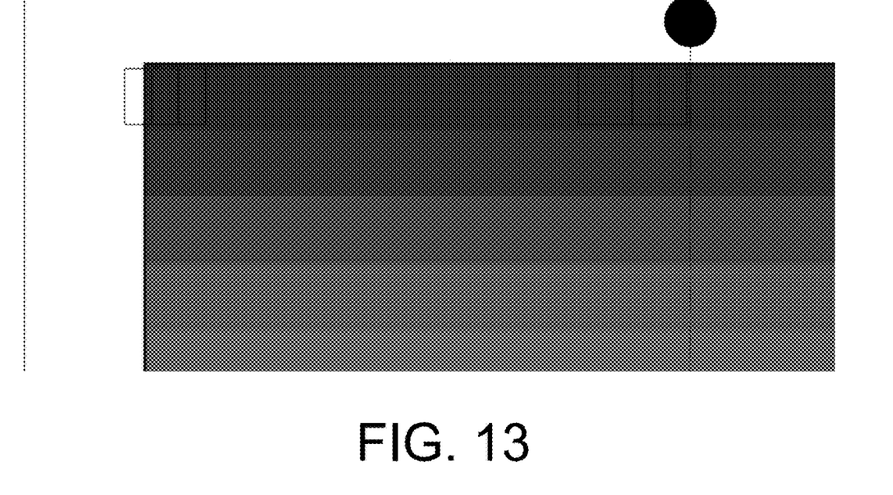
FIG. 13 is a principle diagram of boundary determination during edge finding in Embodiment 1.

S3: as shown in FIG. 13, performing edge finding operation on a corrected image, which specifically includes:

S301: repositioning a top midpoint of the color level image by using an image template matching algorithm according to the corrected image.

S302: calculating a top center.

Figure 12:
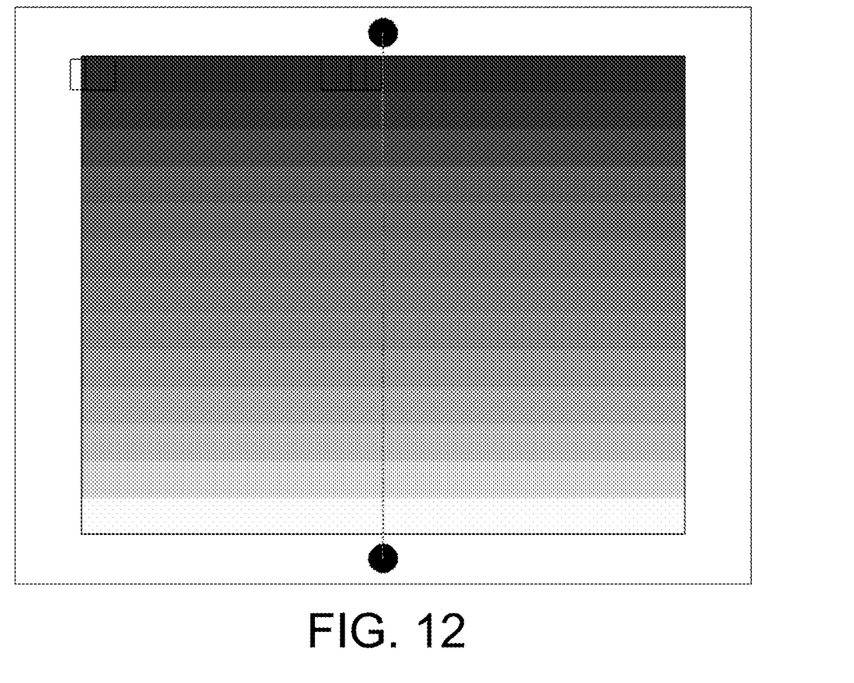
FIG. 12 is a schematic diagram of edge finding operation in Embodiment 1.

S303: as shown in FIGS. 12 and 13, setting a sampling step length, testing an average color density value of a sampling region on a left side by using a loop algorithm, and when it is showed that the average color density value of the sampling region is greater than a set value, indicating that a boundary has been reached, stopping loop, and retracting one sampling step length; and continuing to perform same sampling on a right side, and determining loop stop.

S4: dividing the image into regions, which includes:

S401: calculating the total number of effective regions, that is, calculating the total number of left and right sampling regions.

Figure 14:
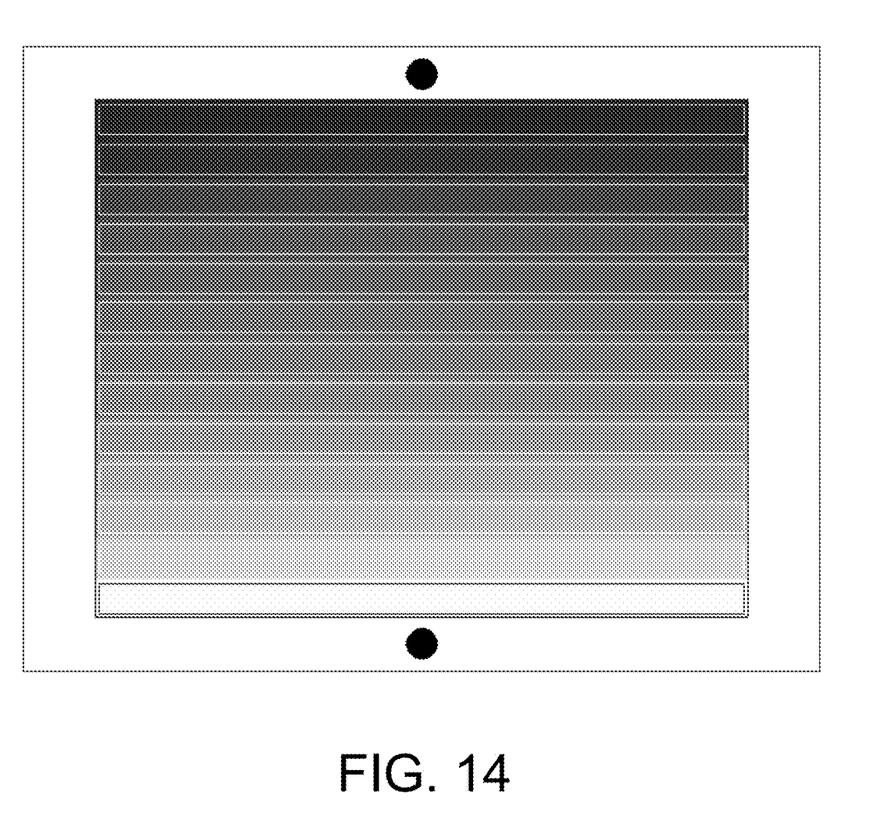
FIG. 14 is a schematic diagram of drawing a rectangular sampling region in Embodiment 1.

S402: as shown in FIG. 14, drawing a rectangular sampling region on the deep color image according to a width of the sampling regions and a width of the color levels.

S5: calculating a deviation, which includes:

S501: defining a color density value with a length of 13, and storing expected color density values of 13 color levels on the black standard 13-color level image that are printed on paper.

S502: defining an array with the number of rows being 13 and the number of columns being equal to the total number of effective regions for storing difference values between average color density values of the color levels and the regions and the expected color density values in S501.

Figure 15:
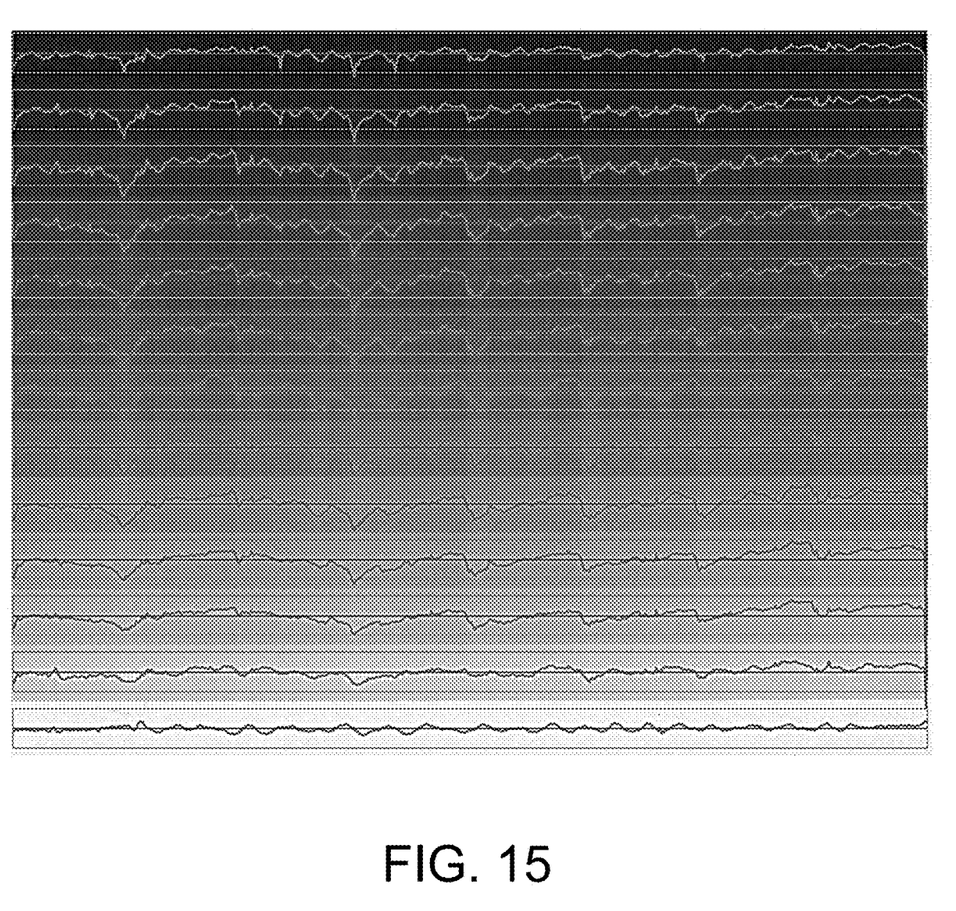
FIG. 15 is a visual diagram of a color density characteristic curve in Embodiment 1.

S503: visualizing color density data, and as shown in FIG. 15, drawing a deviation broken-line graph in a corresponding rectangular sampling region.

Embodiment 2

Figure 16:
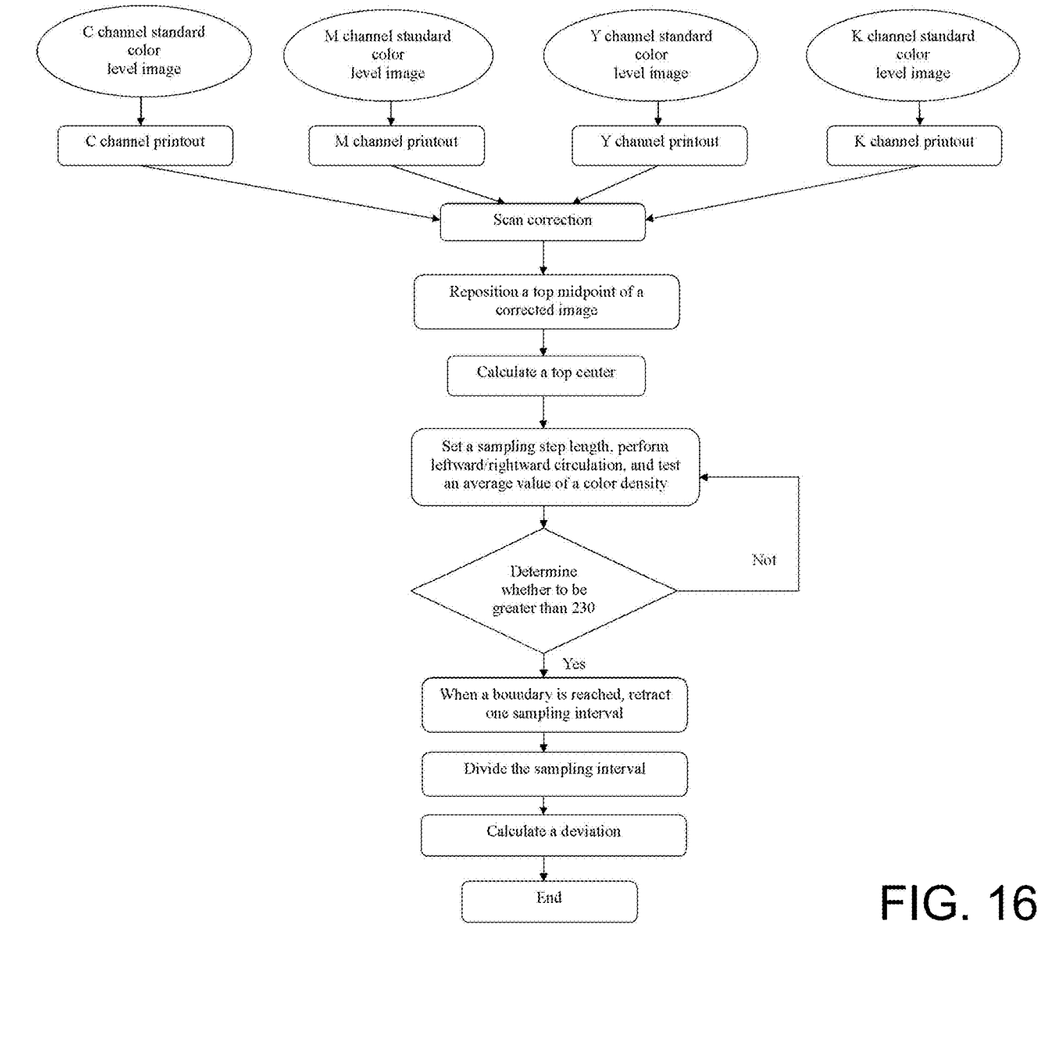
FIG. 16 is a flow chart of Embodiment 2.

This embodiment is another specific embodiment of the above method for acquiring a color density characteristic curve in printing. This embodiment takes a CMYK four-channel image as an example, and its flow is as shown in FIG. 16. Specifically, a standard color level image is designed separately for each channel, and then is subjected to printout and scan correction. The steps are similar to those in the above embodiment, and will not be repeated. Finally, it should be noted that the above embodiments are merely used to illustrate the technical solution of the present invention, rather than limiting it; although the present invention has been described in detail with reference to the above-mentioned embodiments, those of ordinary skill in the art should understand that: they may still modify the technical solution described in the above-mentioned embodiments, or equivalently substitute part or all of technical features in the technical solution; and these modifications or substitutions do not make the essence of the corresponding technical solution depart from the scope of the technical solution of the embodiments of the present invention.

What is claimed is:

1. A method for acquiring a color density characteristic curve in printing, comprising:
    S1: designing a standard N-color level image of a single color channel, wherein in S1, a height of each color level is greater than ½ of a printing resolution in a height direction;
    S2: performing printout and scan correction on the standard N-color level image;
    S3: performing edge finding operation on a corrected image;
    S4: dividing the image into regions; and
    S5: calculating a deviation.

2. The method for acquiring a color density characteristic curve in printing according to claim 1, wherein in S1, a value of N is specified as follows:
    for a single-channel color level image with an 8-bit depth, N is not less than 5; and
    for a single-channel color level image with a 16-bit depth, N is not less than 10.

3. The method for acquiring a color density characteristic curve in printing according to claim 2, wherein S2 comprises:
    S201: adding a positioning mark pattern at midpoints of white spaces of an upper edge and a lower edge of the standard N-color level image, respectively;

S202: printing the standard N-color level image containing the positioning mark patterns on paper by using a printer;

S203: scanning printed paper in S202 by using a scanner, to obtain a single-channel image file; and S204: correcting a rotation deviation of a single-channel image generated during printing and scanning.

4. The method for acquiring a color density characteristic curve in printing according to claim 2, wherein S3 comprises:

S301: repositioning a top midpoint of the standard N-color level image by using an image recognition module according to the corrected image;

S302: calculating a top center; and

S303: setting a sampling step length, testing average color density values of sampling regions on left and right sides by using a loop algorithm, and when it is showed that the average color density values of the sampling regions are greater than a set value, stopping loop and retracting one sampling step length.

5. The method for acquiring a color density characteristic curve in printing according to claim 2, wherein S4 comprises:

S401: calculating the total number of effective regions, that is, calculating the total number of left and right sampling regions; and S402: drawing a rectangular sampling region on the color image with the 8-bit or 16-bit depth according to a width of the sampling regions and a width of the color levels.

6. The method for acquiring a color density characteristic curve in printing according to claim 2, wherein S5 comprises:

S501: defining a color density value with a length of N, and storing expected color density values of N color levels on the standard N-color level image that are printed on paper;

S502: defining an array with the number of rows being N and the number of columns being equal to the total number of effective regions for storing difference values between average color density values of the color levels and the regions and the expected color density values in S501; and S503: drawing a schematic deviation diagram in a corresponding rectangular sampling region.

7. The method for acquiring a color density characteristic curve in printing according to claim 1, wherein in S1, 70% of color levels are distributed in a range of high ½ color level values; and a color level 0 is 10% lower than a full color level value.

8. The method for acquiring a color density characteristic curve in printing according to claim 4, wherein S2 comprises:

S201: adding a positioning mark pattern at midpoints of white spaces of an upper edge and a lower edge of the standard N-color level image, respectively;

S202: printing the standard N-color level image containing the positioning mark patterns on paper by using a printer;

S203: scanning printed paper in S202 by using a scanner, to obtain a single-channel image file; and S204: correcting a rotation deviation of a single-channel image generated during printing and scanning.

9. The method for acquiring a color density characteristic curve in printing according to claim 4, wherein S3 comprises:

S301: repositioning a top midpoint of the standard N-color level image by using an image recognition module according to the corrected image;

S302: calculating a top center; and

S303: setting a sampling step length, testing average color density values of sampling regions on left and right sides by using a loop algorithm, and when it is showed that the average color density values of the sampling regions are greater than a set value, stopping loop and retracting one sampling step length.

10. The method for acquiring a color density characteristic curve in printing according to claim 4, wherein S4 comprises:

S401: calculating the total number of effective regions, that is, calculating the total number of left and right sampling regions; and S402: drawing a rectangular sampling region on the color image with the 8-bit or 16-bit depth according to a width of the sampling regions and a width of the color levels.

11. The method for acquiring a color density characteristic curve in printing according to claim 4, wherein S5 comprises:

S501: defining a color density value with a length of N, and storing expected color density values of N color levels on the standard N-color level image that are printed on paper;

S502: defining an array with the number of rows being N and the number of columns being equal to the total number of effective regions for storing difference values between average color density values of the color levels and the regions and the expected color density values in S501; and S503: drawing a schematic deviation diagram in a corresponding rectangular sampling region.

12. The method for acquiring a color density characteristic curve in printing according to claim 1, wherein S2 comprises:

S201: adding a positioning mark pattern at midpoints of white spaces of an upper edge and a lower edge of the standard N-color level image, respectively;

S202: printing the standard N-color level image containing the positioning mark patterns on paper by using a printer;

S203: scanning printed paper in S202 by using a scanner, to obtain a single-channel image file; and S204: correcting a rotation deviation of a single-channel image generated during printing and scanning.

13. The method for acquiring a color density characteristic curve in printing according to claim 5, wherein S204 comprises:

S2041: searching for the upper and lower positioning mark patterns on the obtained single-channel image by using an image recognition module, and calculating center pixel coordinates of the two positioning mark patterns, to obtain an abscissa deviation Δx and an ordinate deviation Δy of the center pixel coordinates of the two positioning mark patterns;

$$\theta = \frac{\Delta x}{\Delta y \times \pi} \times 180°;$$

S2042: calculating a deflection angle θ according to a formula and

S2043: correcting the color level image with image rotation in an image processing technology according to the deflection angle θ.

14. The method for acquiring a color density characteristic curve in printing according to claim 1, wherein S3 comprises:

S301: repositioning a top midpoint of the standard N-color level image by using an image recognition module according to the corrected image;

S302: calculating a top center; and

S303: setting a sampling step length, testing average color density values of sampling regions on left and right sides by using a loop algorithm, and when it is showed that the average color density values of the sampling regions are greater than a set value, stopping loop and retracting one sampling step length.

15. The method for acquiring a color density characteristic curve in printing according to claim 1, wherein S4 comprises:

S401: calculating the total number of effective regions, that is, calculating the total number of left and right sampling regions; and S402: drawing a rectangular sampling region on the color image with the 8-bit or 16-bit depth according to a width of the sampling regions and a width of the color levels.

16. The method for acquiring a color density characteristic curve in printing according to claim 1, wherein S5 comprises:

S501: defining a color density value with a length of N, and storing expected color density values of N color levels on the standard N-color level image that are printed on paper;

S502: defining an array with the number of rows being N and the number of columns being equal to the total number of effective regions for storing difference values between average color density values of the color levels and the regions and the expected color density values in S501; and S503: drawing a schematic deviation diagram in a corresponding rectangular sampling region.

* * * * *